June 30, 1959   C. H. LAPSLEY   2,892,475
TURRET-SUPPORTED TOOL
Filed Dec. 31, 1954   9 Sheets-Sheet 1
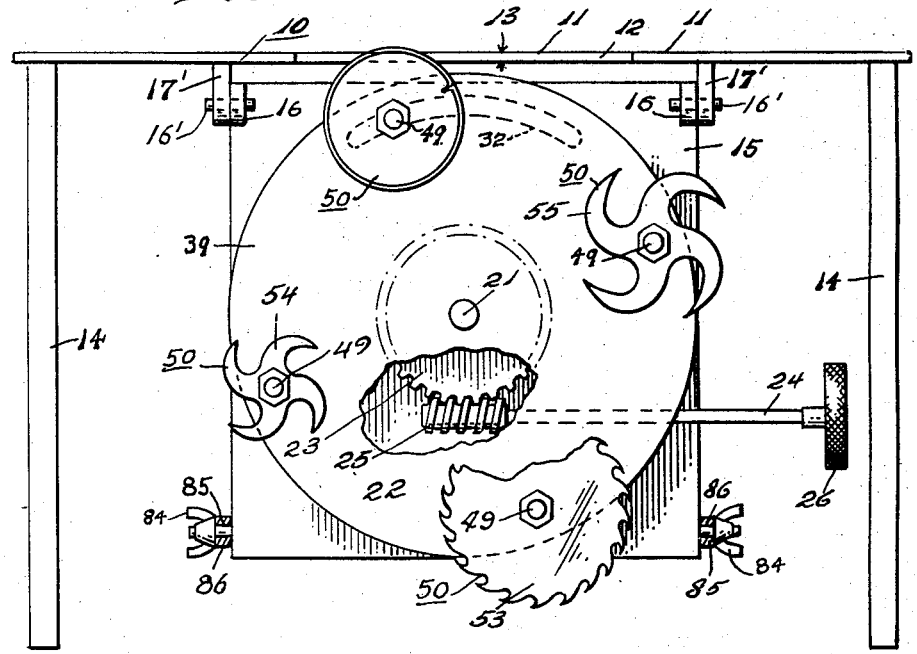
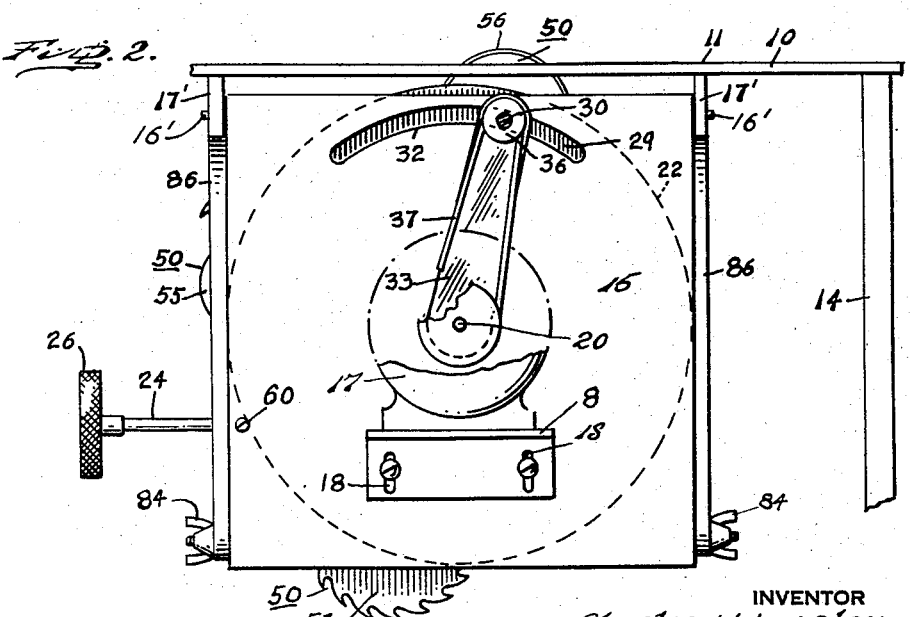
INVENTOR
Charles H. Lapsley.
BY
Frank H. Borden
ATTORNEY June 30, 1959  C. H. LAPSLEY  2,892,475
TURRET-SUPPORTED TOOL
Filed Dec. 31, 1954  9 Sheets-Sheet 2
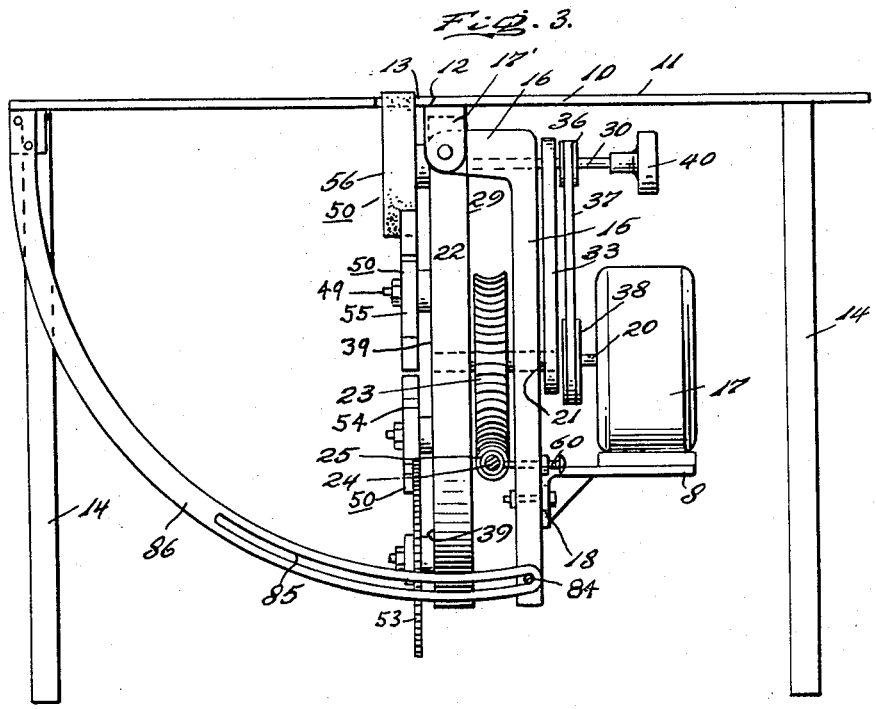
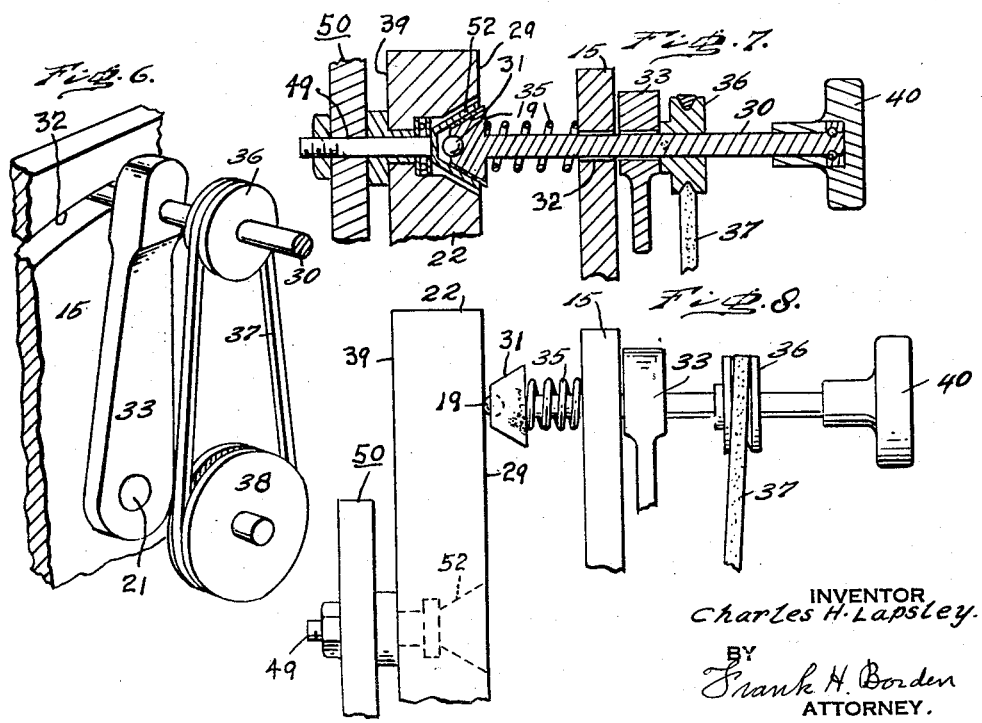
INVENTOR
Charles H. Lapsley.
BY
Frank H. Borden
ATTORNEY.

June 30, 1959  C. H. LAPSLEY  2,892,475
TURRET-SUPPORTED TOOL
Filed Dec. 31, 1954  9 Sheets-Sheet 3
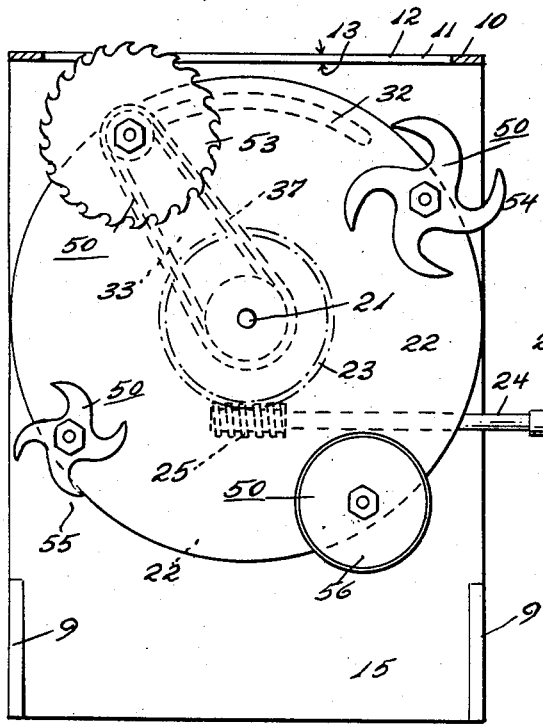
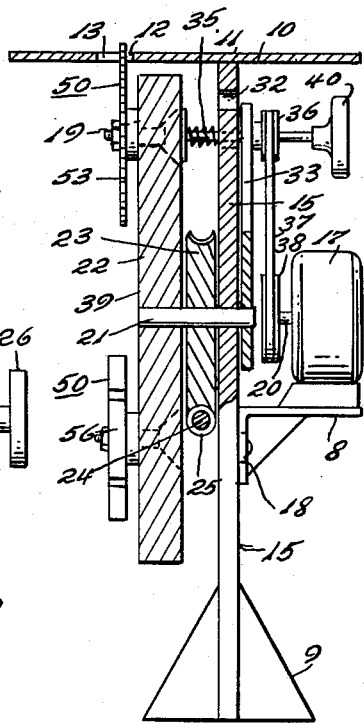
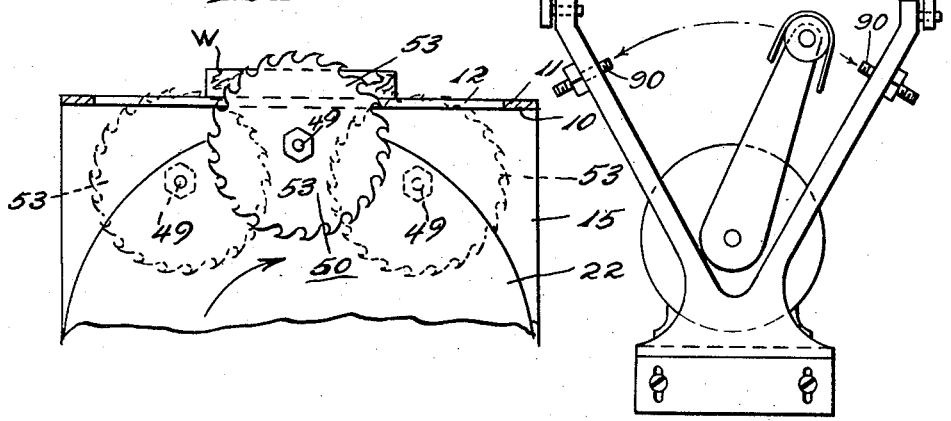
INVENTOR
Charles H. Lapsley.
BY
Frank H. Borden
ATTORNEY June 30, 1959 C. H. LAPSLEY 2,892,475
TURRET-SUPPORTED TOOL
Filed Dec. 31, 1954 9 Sheets-Sheet 4
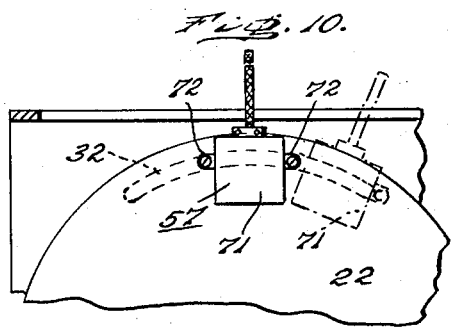
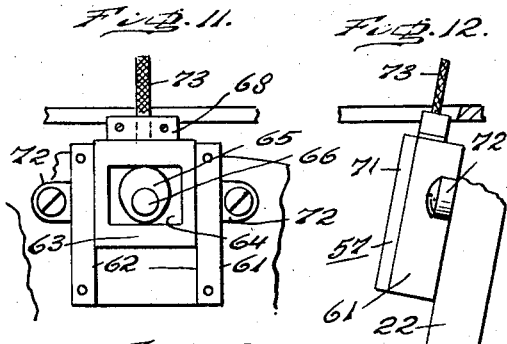
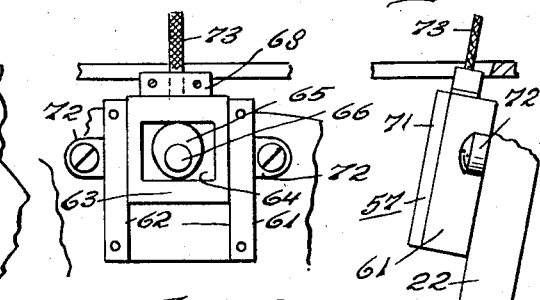
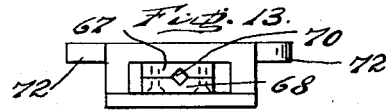
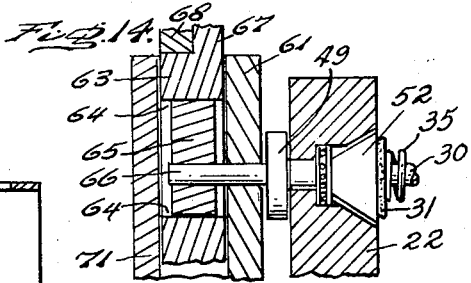
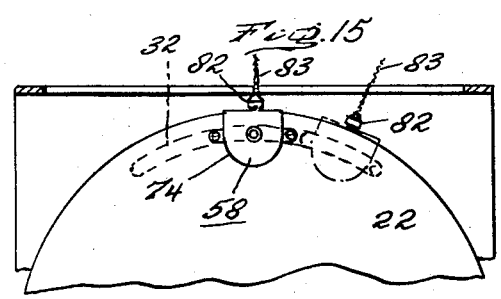
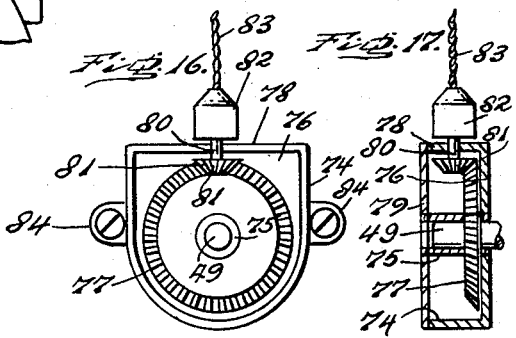
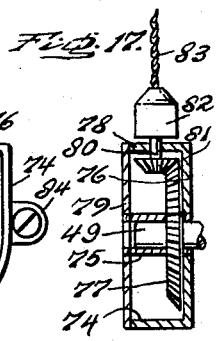
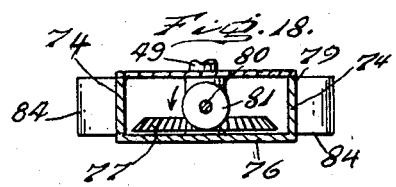
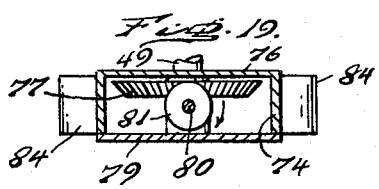
INVENTOR
Charles H. Lapsley.
BY
Frank H. Borden
ATTORNEY.

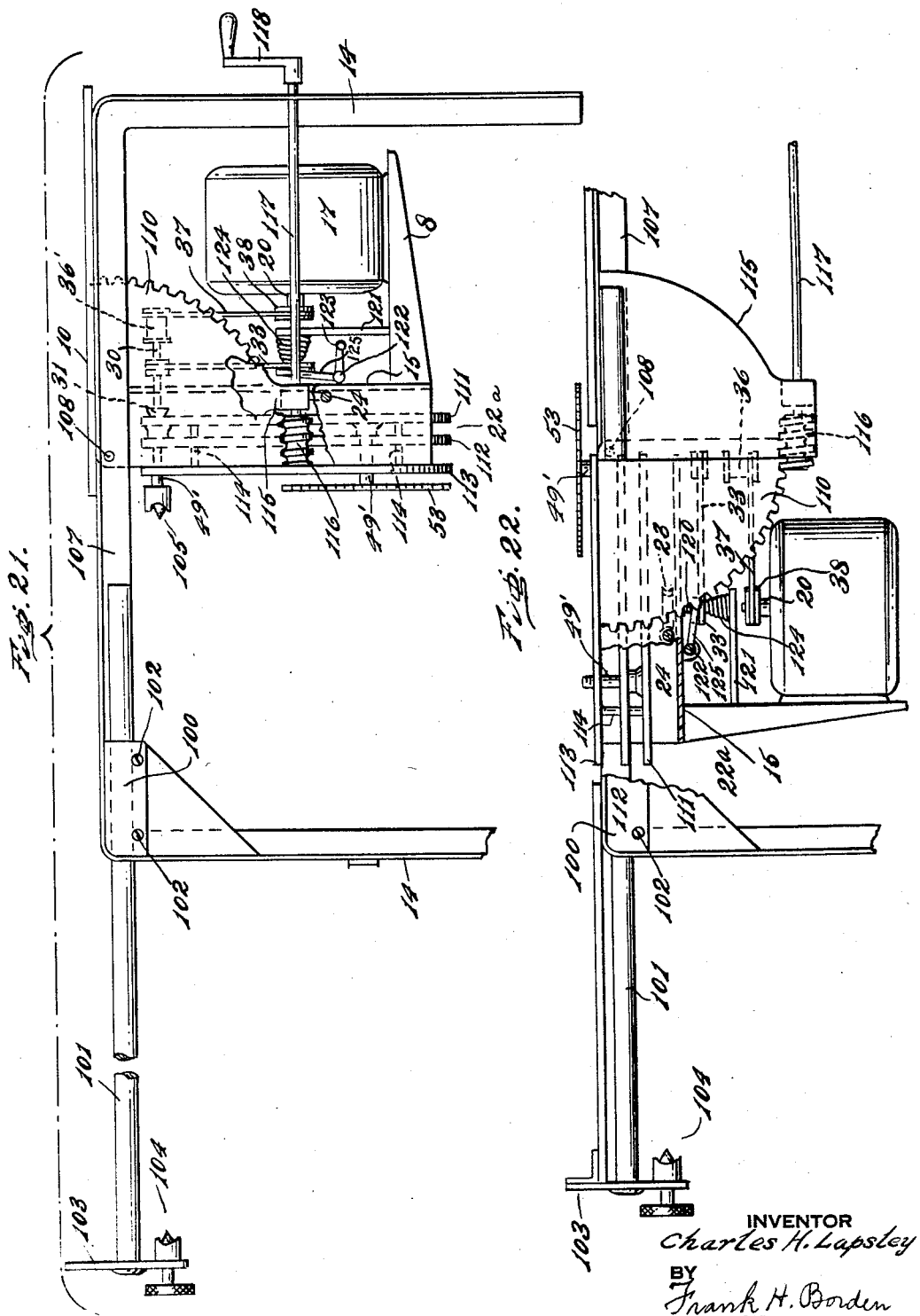

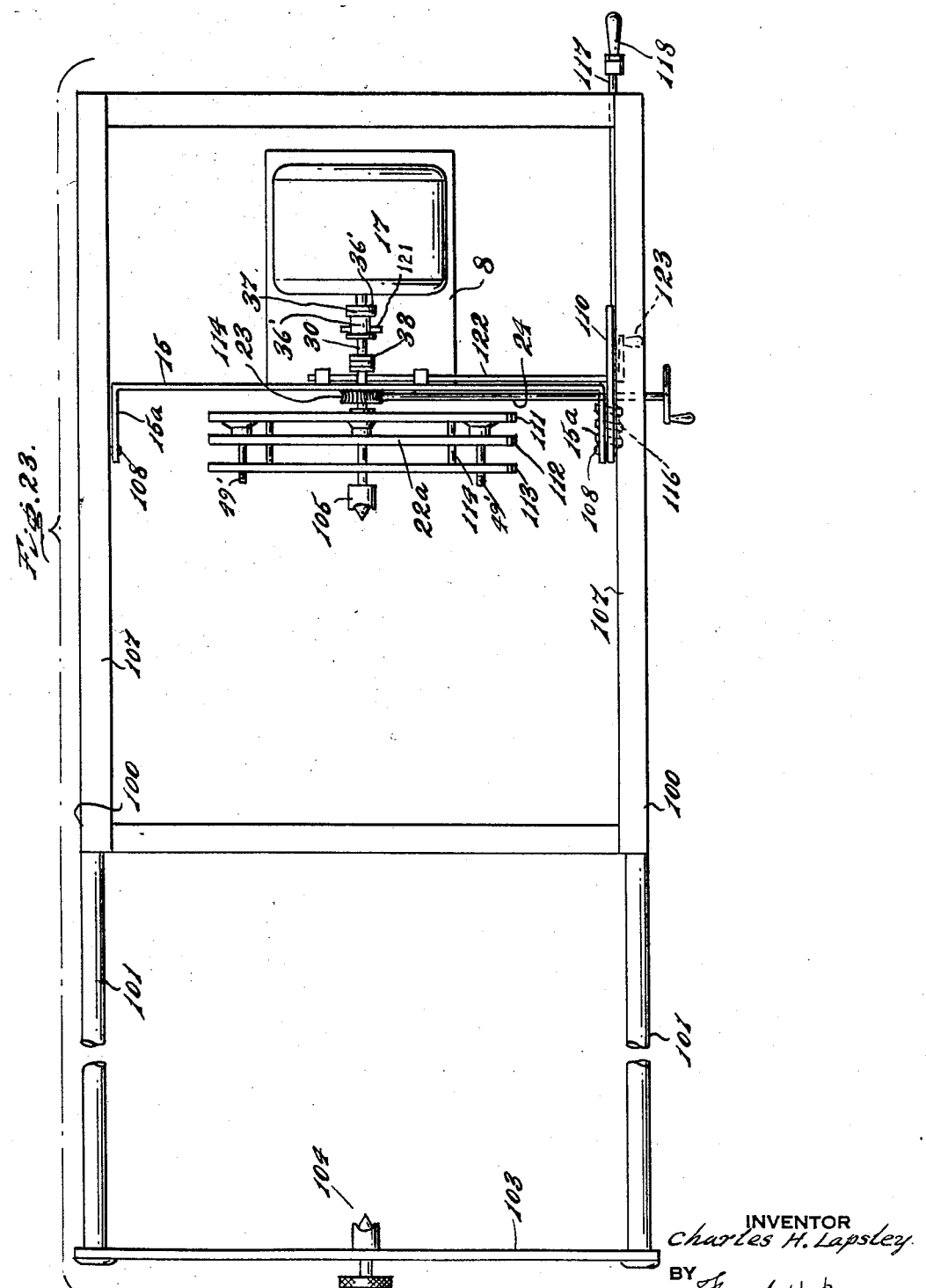

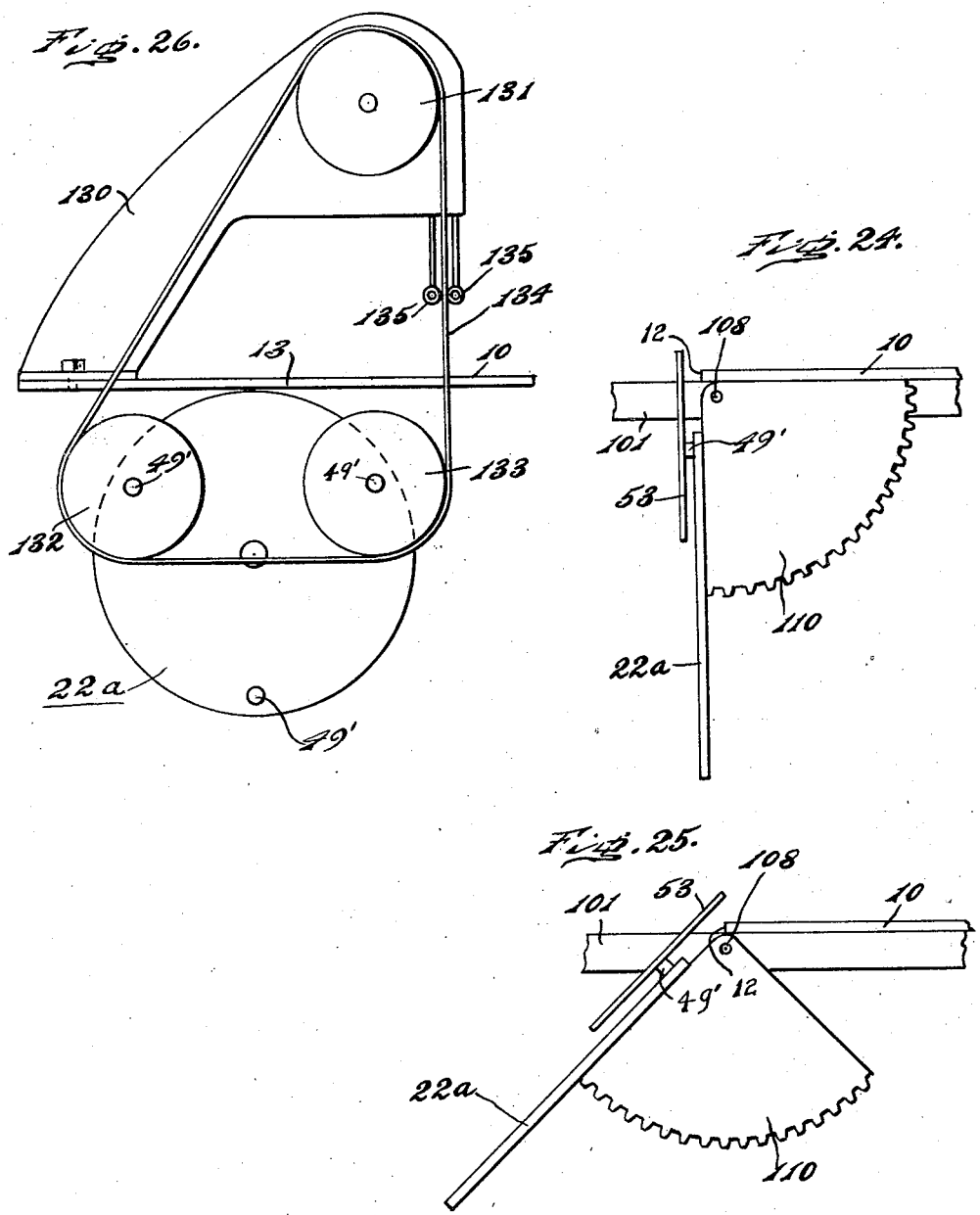

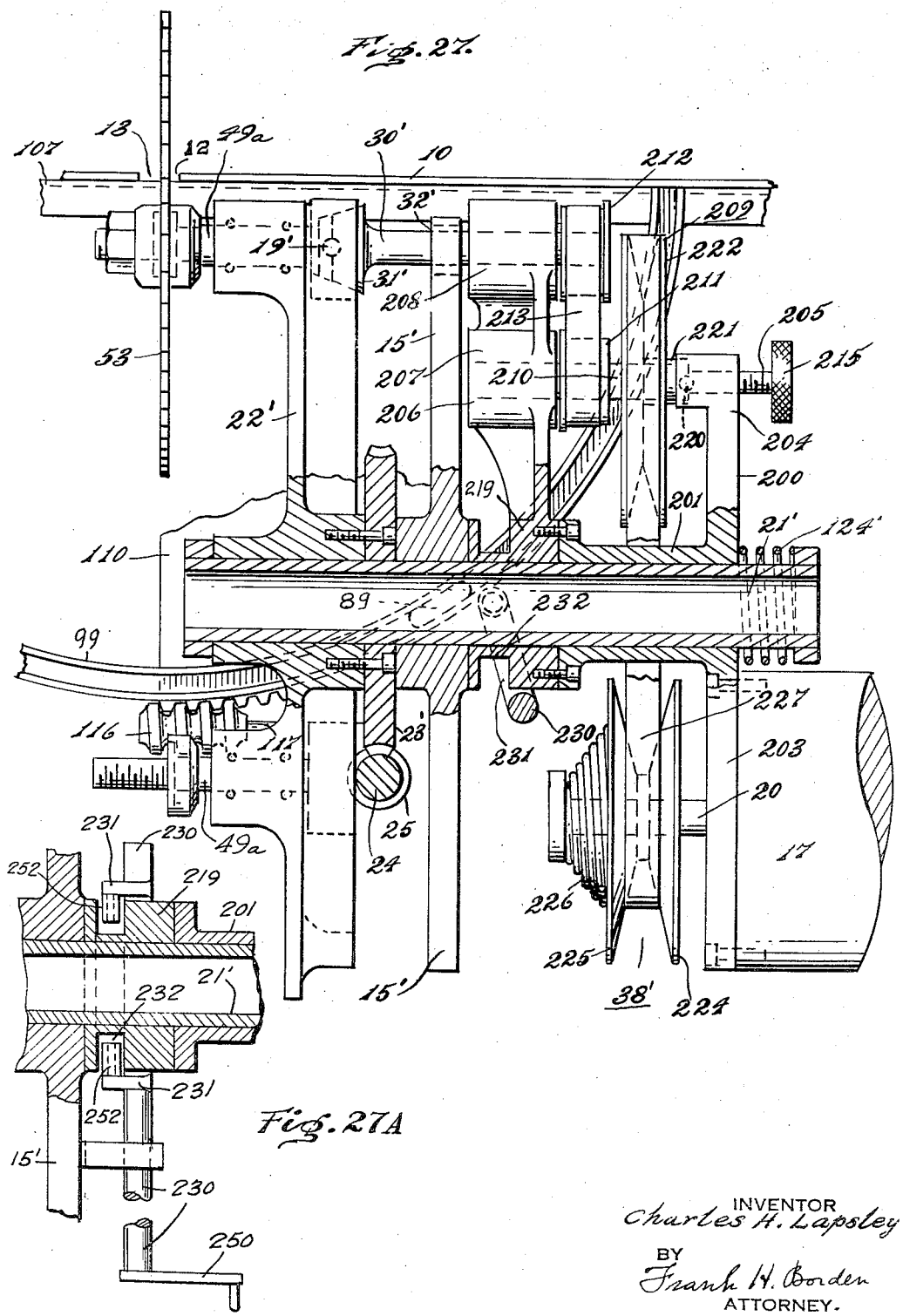

June 30, 1959 C. H. LAPSLEY 2,892,475
TURRET-SUPPORTED TOOL
Filed Dec. 31, 1954 9 Sheets-Sheet 9
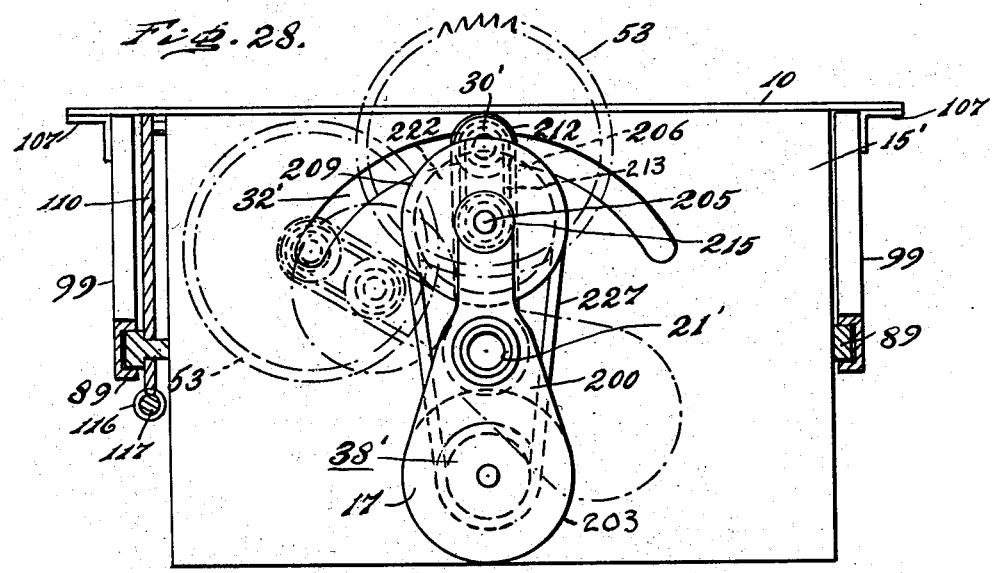
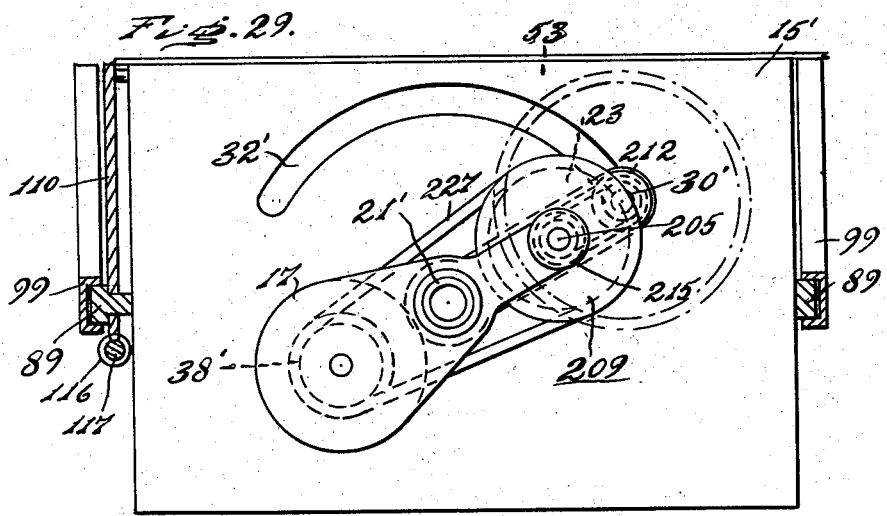
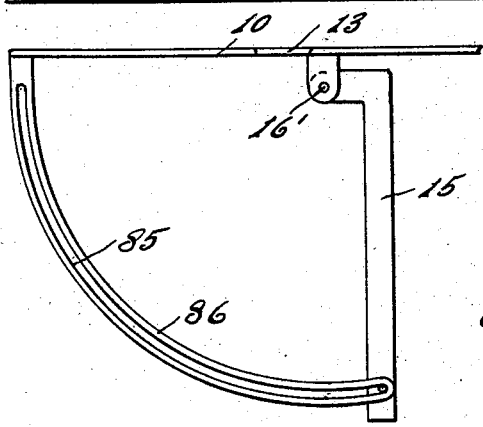
INVENTOR
Charles H. Lapsley.
BY
Frank H. Borden
ATTORNEY

United States Patent Office 2,892,475
Patented June 30, 1959

2,892,475

TURRET-SUPPORTED TOOL

Charles H. Lapsley, Philadelphia, Pa.

Application December 31, 1954, Serial No. 479,066

34 Claims. (Cl. 144—1)

This invention relates to material working devices, and pertains particularly to unitary machines for selectively or successively performing a plurality of operations on a given piece of work, or selective operations on various work pieces.

The prior art has developed numerous more or less commercial devices for effecting various operations on raw or semi-finished materials or other work, with a common power source and a plurality of driven operating devices for selective operation by the power source. Thus, it is common to provide a drill unit with a common chuck, into which various tools and the like can be inserted for respectively accomplishing given work steps. In simple forms the power unit has been of the "portable" type, having no fixed or fixable relation to the given work, and in the more complex forms such organizations have been combined into specific compound tool effects. Each has involved the manual replacement of one detachable tool, by another detachable tool, usually loose on a bench or in a kit, each driven by the common power unit. These have required manual dexterity and delays in shifting from one tool to another, which is usually aggravated by the time required for locating the various tools for mounting. In either case, so far as known, there was no predetermined order of use of the various tools, at least as far as a prearranged fixed mounting of tools establishing orderly utilization, was concerned. In the portable tool type, as noted, due to necessary manipulations, the successive tools have had no fixed or certain angular or space relationship to each other or to supported work, so that lack of registration and angular misalignment of one operation on a work piece relative to a preceding or succeeding operation on the same work piece is almost certain. In most cases, with the portable drill type of power plant the successive operations have been boring or drilling steps relative to stationary, usually anchored, work. Except for the skill of the operator, any succeeding boring or drilling operation has been haphazard as regards exact registration with a preceding step result.

On the other hand, turret lathes and devices of this type have presented a succession of progressively positioned tools to a common driving source, rotatably driving the work. In many cases, however, the work is one that cannot be driven or rotated, and the operational steps may not involve boring or drilling.

So far as known, therefore, there is no machine on the market in which all of the tools are secured and relatively fixed in an organization with a common power source, in which either selectively or progressively a plurality of tools can be brought into operative relation to fixed work, with maintenance of the same predetermined angular relation to the work, in the case of moving or sliding work, or alternatively, in which, with the work clamped stationarily, successive tooling steps in the nature of cutting can be successively or alternatively accomplished.

It is among the objects of this invention to provide a common torque delivery for a plurality of machine-mounted tools, for selective operation; to provide a plurality of tools on a common movable support for selective engagement by a common power source; to provide a unitary tool assembly having plural operating tools with which for any given operation a common power source is used; to provide a compound tool in which selectively the work can be moved in translation relative to a relatively fixed but operating or functioning tool, or the operating or functioning tool may be moved in translation relative to the work; to provide a device in which a plurality of tools are provided for successive application to work, in which the angle of tool to work is established and maintained for all of such tools; to provide a unitary structure, comprising a work table, with reference to which work can be mounted for transverse operation by a tool, or, alternatively, the work itself can be mounted for sliding or other movement transverse of a tool; to provide specific improvements in special tools for operation by torque from a power source; to provide improvements in wood-working tool organizations; to provide a plurality of tools for progressive working on work, with a common torque applicator for the respective tools; to provide a wood-working or like tool comprising a device for successively or alternatively effecting a plurality of related operating steps on work; to provide in a common organization a plurality of working tools for operation by a common power source, illustratively comprising a saw, a router, a groover, a sander, a boring unit, a filing or rasping unit, with means for selectively engaging any one thereof with a common power source for operation relative to a work table, in a common working plane of action of each of said tools; to provide a work table and a plurality of tools for operation relative to the table, with means for quickly and easily fixing or changing the level of any tool relative to the table; to provide a working tool such as a circular cutter and work table, with means for adjusting and holding the level of such tool to the work table when moving work relative to such tool, as by sliding and guiding same, or to progressively move the tool transversely in a fixed path relative to such work in a fixed relation on the work table, with the same organization of parts; to provide a filing or rasping unit for operation by a rotative power source having an axis normal to the filing axis of motion; to provide an improved shaper or drill unit for actuation by a rotative device having an axis normal to the axis of the shaper shaft; to provide an improved craftsman's assembly for home uses; to widen the scope of operating functions available from grouped and fixed positioned tool components; to provide an apparatus selectively associating a plurality of tools with a common power source without using any hand tools or wrenches; to provide a continuously running power source for selective coupling to any one of a plurality of driven tools without stopping the motor and by simple and easy movements of manual elements; to provide a device mounting a plurality of driven tools with a common power source which while running is shifted from driving relation to one driven tool to another, during which shift all tools are disconnected as a safety measure, facilitating changing of tools or other operations on the tool-mounting device; to provide a plurality of mounted or replaceable tools for operation by a common power source by which practically every known woodworking operation can be accomplished, and with minor changes, can be adapted to reshape other materials such as plastics and soft metals; to provide material-working apparatus adapted selectively to cross cut, rip, dado, join, disc sand, drum sand, shape, cut moulding, drill, grind, polish, buff, file, saber saw, turn or spin, with a basic organization with which driven tools for any of the said operations can readily be associated; to provide material-working apparatus of plural functions as a portable shop; to provide appartaus by which a piece of lumber lying flat and stationary can be ripped or cross cut, joined and sanded on a bevel; to provide a turret tool that can be swung operatively through at least 90° so that the angle of the working tool to the table can be perpendicular thereto or can be swung into parallelism with the table, above the table, or held at intermediate angles thereto; to provide a simple attachment mountable on the table of the device, and utilizing two of the spindles on the turret plate as respective drive and idler pulleys, can operate a highly efficient band saw at very low additional cost; to provide improved safety devices in tool organizations of the type under discussion; to improve the mounting of the motor and the driven clutch member; to provide a motor and clutch assembly using a belt or belt-like drive, in which the alignment and tension of the belt are constant; to provide a motor mount with fixed gearing between the motor and the output shaft having the clutch whereby, while economizing on the manufacturing costs, a gravitationally centered unit is effected requiring the mid-positioning of a driven tool before the clutch can become engaged; to provide a simple and expeditious change-speed gearing for the organization recited; to provide a turret plate with three spindles and an oscillatable power device so arranged that a selected tool in clutched engagement with the motor can move with the turret plate through 120°; and to provide other objects and advantages as will become apparent as the description proceeds.

In the accompanying drawings forming part of this description, Fig. 1 to 20 inclusive (except Fig. 3a) are taken from application Serial No. 257,776, filed November 23, 1951, of which this is a continuation in part, and which said application is now abandoned:

Fig. 1 represents a front elevation of an illustrative form of the invention in a tilting assembly wherein the angle of a given tool to the work on the table can be fixed or changed.

Fig. 2 represents a rear elevation thereof, in partial section.

Fig. 3 represents a side elevation thereof.

Fig. 3a represents a fragmentary side elevation of the same in slightly modified form to enhance the degree of angular change of the turret plate of the invention.

Fig. 4 represents a front elevation of a non-pivoted form of the invention in an illustrative form, in which the illustrative cutting tools work in a fixed vertical plane.

Fig. 5 represents a median vertical section through the form of the invention shown in Fig. 4.

Fig. 6 represents a fragmentary perspective of the mounting of the drive shaft and of the power transmission thereto with reference to the mounting support for the turret plate (not shown) as used in the illustrative forms of the invention.

Fig. 7 represents a fragmentary section through the power transmission shaft from the common motor and its mounting showing the male and female members of the illustrative cone clutch drive in engaged relation, for driving the spindle of a given tool on the turret plate of the apparatus.

Fig. 8 represents a fragmentary elevation of the same organization as is shown in Fig. 7, with the driving shaft axially shifted and the complemental clutch elements disconnected and the turret plate rotated or the drive shaft arcuately shifted to misalignment of the respective clutch elements and with the male clutch element thereof biased against the wiping face of the tool-mounting turret plate.

Fig. 9 represents a fragmentary side elevation of the table, mounting relatively fixed work, with relation to which an illustrative rotary cutting tool is moved in bodily arcuate translation relative to the fixed work, as shown in progressive attitudes, with the first and third relative positions indicated in dotted lines and the intermediate position indicated in full lines.

Fig. 10 represents a special reciprocatory tool, for filing or rasping or the like, as mounted on the tool-mounting turret plate of the invention, shown in a vertical position relative to the work table.

Fig. 11 represents a front elevation of the reciprocating unit of Fig. 10, with the cover plate removed to show the "scotch yoke" type of transmission used therein, in converting generally horizontal rotary power into reciprocation substantially radially of the turret plate, in an illustrative but preferred form.

Fig. 12 represents the tool indicated in elevation in Fig. 10, canted or cocked, with pivotal movement of the turret plate, to indicate a given angular relation of the file or rasp, to the work table in a plane normal to the edge of the slot in the work table.

Fig. 13 represents a top plan of the tool of Fig. 10, showing the illustrative clutch or chuck formation thereof.

Fig. 14 represents a transverse section through the "scotch yoke" assembly of Fig. 11 in its relation to the cone clutch of the drive.

Fig. 15 represents a front elevation of a special rotary translating unit mounted on the rotatable turret plate, shown in fragmentary elevation, as provided for shaping or drilling.

Fig. 16 represents a front elevation of the shaping or drilling unit of Fig. 15, with the front cover removed.

Fig. 17 represents a transverse vertical section, partially in elevation, of the translating unit of Fig. 16.

Figs. 18 and 19 represent respectively horizontal transverse sections through the unit of Fig. 16, to indicate the reversal of the direction of rotation of the shaping or drilling output end of the unit of Fig. 16, according to the side thereof which is juxtaposed to the driving power element.

Fig. 20 represents a rear elevation, partially broken away, of a modified form of the device of Fig. 1, showing a skeletonized form of plate mounting adjustable stops at the ends of the arc of movement of the driven shaft.

Fig. 21 represents a fragmentary side elevation of the invention showing the mechanism by which the axis of the tool can be swung through at least 90°, and showing the important extension of the table by which among other desirable attributes the device can be constituted as a lathe, as, for illustrative purposes, for turning wood.

Fig. 22 represents a similar fragmentary view with the operating portion of the tool swung through the angular distance necessary to change the angle of the axis of the spindle shown in Fig. 21 through at least 90° to the position shown in Fig. 22.

Fig. 23 represents a fragmentary plan of the device as disclosed in Fig. 21.

Fig. 24 represents diagrammatically the setting of the turret plate as in Fig. 21, with an illustrative saw normal to the table.

Fig. 25 represents diagrammatically the saw element and mounting turret at an intermediate position, i.e. at 45° to the table surface between the angle of Figs. 21 and 24 and the angle shown in Fig. 22.

Fig. 26 represents a fragmentary side elevation of the band saw attachment of the device, utilizing two of the illustrative three spindles of the instant slightly modified turret plate for mounting the lower end of the saw, and of which one is the power spindle and the other is an idler pulley.

Fig. 27 represents a fragmentary side elevation of an improved modified organization of drive shaft and motor, obviating the platform 8, while attaining additional advantageous features.

Fig. 27A represents a fragmentary section of the central portion of the assembly shown in Fig. 27, but at right angles thereto to show the organization of the clutch shaft.

Fig. 28 represents a fragmentary end elevation of the motor mount and drive organization of Fig. 27, with the normal gravitational attitude shown in full lines, and one extreme adjusted position in one direction is in dotted lines.

Fig. 29 represents a similar fragmentary end elevation with the motor mount and drive organization shown in its other extreme adjusted position in full lines.

In carrying out the invention in a basic exemplification thereof, a work table is provided having an edge or slot, a turret plate is provided for rotation on an axis generally normal to said plate, on which plate, in angular spacing, a plurality of tool spindles are mounted, with the respective tools thereon lying in a plane generally parallel to said edge. Means are provided for manually rotating said turret plate to bring the spindle-mounted tools successively from a point below the table across said edge to a high point relative to the table, through a return to below the table, and a common power source is provided, which may run continuously, and drives a member which can successively engage, or be manually disengaged from, a tool at any point in its progression across said edge, with means for holding said driven tool at a given setting relative to said table when desired, whereby any given tool can be held stationary at a determined level to said table for operation on work movable on said table, or can be moved transversely in an arc across said table in a plane parallel to said edge for operating on stationary work mounted on said table.

It will be understood that in the simplest form of the invention the turret plate plane of rotation is fixed relative to the edge of said work table. With slight changes, the plane thereof can be made transversely pivotally adjustable relative to said slot or edge, so that the work can be operated on at various predetermined angles to the table surface. In essence, the basic organization can be used either for fixed or pivoted mounting so that the operating portions thereof, being common to both forms, will have the same reference characters. The basic organization with pivotal mounting will first be described.

Referring to Figs. 1, 2, and 3, a table 10 is provided, of such area as may be required, having an upper planar work surface 11. This surface may mount any fixed or adjustable guides, stops, clamps, or other devices to facilitate operations on the work. Surface 11 has an edge 12 disposed either fixedly or by suitable slide elements in the table 10 (not shown) adjustably for maintenance of close support of the work to the tools, to be described. Usually edge 12 is one side of a tool slot 13.

The work table 10 is suitably supported, as by rigid, or collapsible or folding, legs 14.

The power and tool organization comprises a support 15, which may comprise a solid plate or a mere spider formation, if desired, mounted by pivot pins 16' in ears 16, in the pivotal form, on brackets 17', rigidly mounted on table 10, preferably, slightly below the plane of table surface 11. In the simplified form of the invention, as shown in Figs. 4 and 5, in which the tools are in a fixed plane relative to the table surface, the support 15 is vertical and rigid, and forms, with suitable base-supporting elements 9, the support for the organization. In this case, table 10 is mounted directly on support 15. Of course, any desired or necessary supplemental or auxiliary supports may be provided. Mounting the table 10 on support 15 conduces toward smallness and compactness, and enhances the portability of the unit, although the pivoted form is also contemplated to have this desirable attribute, especially in smaller forms for the use of home craftsmen and the like. Plate support 15 in both cases mounts a vertically adjustable, generally horizontal, platform 8, upon which the power plant 17 is mounted. While an internal combustion motor or even a steam engine may be mounted on the platform 8, for general purposes of description, and for general utility in the preferred form of compact unitary structure, an electric motor 17 is provided as the common power plant. The platform 8 is preferably made vertically adjustable, as by slots 18 in plate 15, and the motor 17 is horizontally adjustable on the platform in both directions, preferably, as is common with motor mounts of general utility in home appliances and the like. The purpose of the adjustments both vertically and horizontally is for the precise co-axial location of the axis of the output shaft 20 of the motor, with reference to the axis of the tool-mounting turret plate and of the coupling control member, to be described.

A shaft 21 is journalled horizontally in the vertical support 15 below table 10, mounting and keyed to the annular turret plate 22, spaced from support 15 by worm gear 23, and from the table 10. Shaft 21 carries and is keyed to worm gear 23. Support plate 15 mounts suitable bearings for a worm shaft 24, carrying the worm pinion 25, in mesh with the worm wheel 23. A set screw 60 may be threaded in support 15 for locking engagement of worm shaft 24 to lock the turret plate against motion. A crank or other manual actuating means 26 is keyed to shaft 24. Rotation of shaft 24 by crank 26, or the like, secures rotation of turret plate 22, through the worm gear train and shaft 21. The rotatable turret plate 22 has an average plane which is initially normal to table 10, and is permanently normal thereto in the relatively fixed apparatus of Figs. 4 and 5. Turret plate 22 can be rotated through more than a full 360°, as may be desired.

At angularly spaced distances, the plate mounts a plurality of tools, or, as may be preferable under certain conditions, a plurality of tool-mounting and actuating spindles 49 with which the specific tools desired in a given combination of tools can be operatively associated. Spindles 49 may be threaded to receive appropriate tools, held by a lock nut, or the spindles may have angular shaft portions to receive and rotate complemental tool portions, mounting a terminal nut or cotter key or the like, as seems most expedient. Each of the respective tools 50 on tool spindles 49 are arranged or provided for selective alternate interconnection and driven relation to a driving shaft 30 slidable in the support plate 15 and rotated on an axis parallel to but spaced from shaft 21. Main or common drive shaft 30, at the inner end, mounts a male cone clutch or other interlocking engageable or disengageable member 31, carrying an antifriction ball or like end member 19, for antifriction bearing against the inner surface 29 of the rotatable turret plate 22. Shaft element 30 constitutes a driving element and is axially slidable for engaging and disengaging the clutch, and passes through and is journalled for rotation and support in one end of an arm 33, pivoted on turret plate shaft 21. Arm 33 swings in an arc in a plane normal to shaft 21, and the shaft 30 carried thereby passes through an arcuate slot 32 in generally fixed support or support plate 15. A spring 35 is provided, preferably in concentric relation to shaft 30, and so disposed as to bias the head of the cone clutch toward the face 29 of the turret plate 22. Illustratively, it may compress between male clutch member 31 and the inner surface of support 15 straddling arcuate slot 30. Arcuate slot 32, through which drive shaft 30 passes, is concentric with shaft 21 so that the arm 33, unless restrained, can swing through an appreciable arc parallel to turret plate 22, and the shaft 30, of course, moves with it through such arc. In this relation, the ends of the arcuate slot 32 comprise stops or limits for the shaft 30, in its arcuate movement. In a skeleton form of support 15, as shown in Fig. 20, the limits may comprise adjustable elements 90 at each end of a spacial movement path of drive shaft 30. The shaft 30 mounts, in keyed relation, a pulley or the like 36, on which the transmission belt 37 is mounted. The other loop of the belt 37 passes about a pulley 38 on the motor shaft 20. The shaft 30 also mounts, at its outward free end, a frictionless handle or the like, 40, by which the shaft 30 can be manually pulled axially against the bias of the spring 35, for unclutching the power from any given tool. Handle 40 is illustrated as typical of any sort of retracting mechanism, including any sort of leverage or linkage by which the drive shaft can be mechanically retained in retraction, despite arcuate movement of the drive shaft 30 with arm 33, including any remote control mechanism for the purpose.

Each tool 50 is mounted fixedly or removably on a shaft or spindle, journalled for rotation in the turret plate 22, in keyed or driven relation to the female member 52 of the cone clutch. Clutch members 52 of the respective tool spindles 49 are recessed in the face 29 of the turret plate 22, with their axes lying in the same peripheral line, and separated by uninterrupted smooth face portions 29. While for illustrative purposes the respective tools shown are provided with coupled drive shafts, it will be understood that the preferred organization provides a plurality of more or less identical driven spindles 49, upon which respective tools are mountable and removable to accord with the particular grouping of particular tools desired.

The rotary tools mounted on or coupled to the driven spindles have their respective cutting or working faces in fixed relation to the tool side face 39 of the turret plate 22, and for purely illustrative specific instance may comprise, as disclosed in Figs. 1 to 4, a circular or disc saw 53, a small router or groover 54, a larger router or groover 55, and a drum sander 56. If desired, the sander, instead of being cylindrical with the sandpaper or other abrasive on the outer cylindrical periphery, may comprise a disc or the like containing abrasive or mounting a planar or bevelled-faced sanding or cutting disc. Alternatively, or additively, the turret plate may mount the saber saw, filing or rasping unit 57 or the rotatable shaper or drill unit 58 as illustrated generally in Figs. 10 and 15, to be further described. Other tools may be substituted or added without affecting the principles of the invention. In this connection, it will be understood that although a small unit for home craftsmen's use may be preferred, the sizes and therefore the number of individual tool spindles or tools on one apparatus may be as desired, including large sizes with a multiplicity of tool spindles or tools angularly spaced about plate 22.

In the assembly as so far described of both the relatively fixed and the relatively pivoted forms, it will be seen that shaft 30 is biased inwardly against the face 29 of the turret plate by spring 35, and when no female cone clutch member 52 is generally aligned therewith the male cone clutch member is held spaced from the face 29 and out of clutching relation by the end ball member 19 or like antifriction device. With further manual retraction, either direct or through suitable linkage or leverage, the ball end can be moved and held out of contact with turret plate face 29. At either partial retraction, with the ball 19 engaging face 29, or with full retraction out of such contacting engagement, it will be observed that by manual swinging of the arm 33, the transverse drive shaft 30 mounting the male cone clutch member 31, can move bodily in translation angularly of the turret plate, with the upper end of the arm 33 moving parallel to and the shaft 30 traversing the arcuate slot 32 in the support 15, between limits formed by the terminal ends of the slot, or until the ball end 19 slips from the turret plate face 29, guiding the male cone clutch member 31 into whatever female cone clutch member 52 is in general alignment therewith. At this point the male cone clutch member 31 enters and engages the instant female cone member 52 and the rotation of the instant spindle 49 and tool 50 begins. As noted, in this connection, the motor 17 is continuously driven, and consequently through the belting, the shaft 30 and male cone member 31 are being continuously driven. It requires mere engagement of the clutch members to start the given tool into immediate rotation.

The manual setting of the arm 33, and consequent disposition of the shaft 30 at some setting in the arcaute slot 32, effects a setting of the level of the shaft 30 with reference to the upper plane 11 of the table, as the slot is generally tangential to the table 10 in its relationship and presents its concave side downwardly. It is contemplated that if desired temporary locking means may be mounted on the arm 33 to hold it in any desired given adjusted position. It will be seen, however, that for general purposes the manual setting of arm 33 need not actually be locked as, in the interengagements of the clutch, the arm 33 is effectively locked through the shaft 30 into the turret plate, and the latter is irreversible by reason of the work drive. In this connection, however, as a further safeguard against relative movements of the parts, as previously noted, the set screw 60 mounted on support 15 bears against shaft 24, so as to lock the shaft and thus the turret plate 22 against undesired angular motion.

It will be seen that according to the setting of the arm 33 and the location of the shaft 30 in the arcuate slot 32 in support 15, the level of the drive shaft 30 relative to the table 10 can be set or varied, with a high point in the center of the arcuate slot, and low points at the extreme ends of the downwardly presenting arcuate slot. As the interlocking of the drive shaft 30 with a given rotated tool 50 on turret plate 22 determines the horizontal or transverse axis of the coupled driving and driven units, and as, by the coupling, subsequent rotation of the turret plate moves drive shaft 30 in slot 32, as arm 33 is swung, the operating edges or portions of the coupled tool can be given any desired elevation relative to the table 10 and any change thereof desired during its operation. As a specific instance, the turret plate 22 is rotated until the disc saw 53, for example, has been moved up into operative position relative to the top surface 11 of the table 10. This operative position may be predeterminedly that which disposes the cutting periphery of the disc or saw blade at a desired level with or just below table top 11, or any desired elevation above the table top 11, in passing across the edge 12 of the slot through which the disc saw is going to work as a result of rotation of the turret plate 22. This level may be such as to merely cut a shallow slot in work sliding on the table, or of such greater elevation as to cut off or sever work of appreciable thickness. After moving the turrent plate by rotation of the worm shaft, by crank or handle 26, it will be seen that whatever the instantaneous angular setting of the arm 33 may be, the antifriction handle 40 or the recited linkage is used to retract the shaft 30, and disconnect the cone clutch engagement, with any last used tool. While this axial retraction moves the pulley 36 slightly out of line with the pulley 38 on the motor shaft, due to the flexibility of the belt 37, this makes no particular difference in continuation of the drive of shaft 30. With the shaft 30 retracted against the bias of the spring 35, and held in a retracted position while the worm shaft 24 is rotated, the previously engaged tool is moved peripherally out of line with drive shaft 30 and also to a position below the level of the table 10, as the next tool is elevated to a useful relation to the table surface 11. The turret plate movement synchronously brings the next tool into a position to be engaged by drive shaft 30. Upon release of the handle 40 the antifriction ball end 19 is biased to abut and engage slidably against the face 29 of the plate between tools as the rotation of the turret plate 22 is continued. If an undesired tool moves peripherally into alignment with the shaft 30 during its release to biased engagement with face 29 of plate 22, the bias tends to force the male clutch member into the complemental female member of the instant tool as the rotation of the turret plate is continued. This may cause momentary engagement and rotation of the undesired tool, but this is released by a second grasping of the handle 40 or actuation of the linkage to retract male clutch member 31, and further motion of the turret plate 22 permits the ultimately desired tool to become aligned with the drive shaft to force rotation thereof at the proper level relative to the upper surface 11 of the table 10, in which attitude of rotative work it is held by the worm drive, augmented as desired by suitable locking means such as the set screw 60 noted.

In the previous discussion, the invention has been considered from the standpoint of a selected tool, working at a fixed point and at a fixed level in the slot 13 relative to the table surface 11. In this utilization the work of whatever nature, is slid manually transversely of the table parallel to the edge 12 of the slot and relative to the operating edge of the instant tool. It will be understood that after a first cut has been made in this way, and for which purpose standard or conventional adjustable guides will be mounted operatively with the table to facilitate the operational step, any second progressive stage of working is accomplished on the cut end of the work, by releasing the drive by retraction of the driving shaft 30, and rotating the turret plate until the next desired tool is engaged by the drive shaft and the succeeding working step is accomplished, with maintenance of the same exact angular relation of tool to work as the first or any previous step, owing to the relation of the various tools to the turret plate, and the plate to the slot 13 and edge 12.

The apparatus has a further important functioning, in the relation of the turret plate 22, any given tool 50, the drive shaft 30, and the pivoted arm 33 to the table 10. With this organization, as shown specifically in Fig. 9, the rotary or disc saw 53, for illustrative example, can be brought into driven relation to the drive shaft 30, with the peripheral cutting edge of the saw just below the level of the surface 11 of the table 10. Work W is mounted fixedly on the surface 11, as by suitable conventional clamps. As the saw is in driven relation to constantly driven shaft 30, by rotation of the turret plate 22, through the manual worm drive, the saw is caused to move arcuately in the slot 13 parallel to the edge 12, to form an annular channel or slot in large work, or to cut completely through the work W while the latter is held stationary.

In tool 57 previously referred to, as shown in Figs. 10 to 14 inclusive, a tool of great adaptibility and utility is provided. While this tool is provided for mounting on the turret plate, as shown in Fig. 10, it is of general utility as a conversion unit to convert rotary movement of a drive unit, into reciprocatory movement in a simple, cheap, and highly efficient manner. It may be operated by any torque source, such as a portable drill or the like, for excellent results. This tool comprises a housing 61 having parallel guide flanges at the sides, as at 62, within which a rectangularly apertured block 63 is slidable. Block 63 contains a rectangular aperture 64, within which a cam 65 is rotatable, in constant engagement with opposing parallel edges of the aperture 64. Cam 65 is mounted to rotate with shaft 66, journalled in the frame housing 61. Shaft 66, which may be a spindle 49 or arranged for engagement by a spindle 49, mounts a female cone clutch member 52, disposed for rotation in the turret plate, as with the other tools, in the utilization thereof with the turret plate 22. The apertured block 63, at the upper end carries or mounts a chuck plate 67, upon which is removably and adjustably mounted a complemental chuck plate 68, and both plates are grooved to define between them a variable chuck aperture 70. A cover plate 71 is removably mounted on the housing, for inspection and lubrication of the "scotch yoke" assembly thus described, and suitable mounting ears or other devices 72 are provided for mounting the yoke assembly on the turret plate or other support. It will be seen that there are many occasions for using such short reciprocatory motion in connection with work on the bench or table 10. A short, generally cylindrical file or rasp or saber saw 73 is shown gripped in the chuck as an illustrative tool. This may comprise a narrow short hack saw blade or like device, if preferred.

Finally, the same remarks apply to the shaper conversion attachment or drill tool 58 of Fig. 15, the details of which are illustrated in Figs. 16 to 19 inclusive. Here again the tool has excellent utility in the turret plate assembly of the apparatus, although adapted for wider use, in converting rotary motion in one plane into rotary motion in a perpendicular plane. This device comprises a housing 74 having side walls 76 and 79, journalling a hollow drive shaft 75 for engagement with a driving member, such as a spindle 49. Shaft 75 mounts a bevelled gear, or the like, 77, adjacent the side wall 76. In a top wall 78 of the housing, a driven shaft 80 is journalled, the inner end of which carries a bevel pinion gear 81 in mesh with the bevel gear 77. The other end of the shaft 80 mounts a chuck or the like 82 in which a drill or shaper 83 is removably mounted. The housing 74 has mounting ears or the like 84 by which it may be mounted on the turret plate 22 or other device supporting same for use, with wall 76 either juxtaposed to or oppositely disposed relative to the mounting devices, such as turret plate 22, for selection of the rotary direction of chuck 82, with a uni-directional driving member. The shaft 75 either carries the same sort of cone clutch mechanism as does the device of Fig. 14 for engagement and disengagement relative to the driving shaft, when used in the apparatus of this invention, or this is provided by the associated spindle 49. While it may not be of primary importance in use on the turret plate, it is an important feature of this phase of the invention that unit 58 is bodily reversible in its application to the support, so that with a uni-directional power source, applied to opposite sides of the housing, the direction of rotation of the shaft 80 may be clockwise or counterclockwise.

It is a feature of the invention, as shown in Figs. 1, 2, and 3, that the entire power and tool organization be pivoted so as to vary the angular relation of the turret plate, and thus of the generally parallel tools thereon, as well, to the plane of table 10. This is accomplished by swinging the assembly on the pivots 16' in a position set by the tightening of screw clamps 84, or the like, on the movable pivotal support portion 15, relative to the slots 85 in the table-mounted arcuate arms 86. This angular relation, with the plurality of tools, ensures that each succeeding work step on the work is at the same angle thereto as all preceding steps. The tools being disposed radially of the rotatable turret plate are thus at various angles to the table 10, as the turret plate is initially pivotally swung with aligned support 15, and is additionally rotated. While this latter compound function may not mean much with rotatable tools, such as the disc cutters shown, with tools such as are shown in Figs. 10 and 15 it is quite important. As these are preferably mounted so that the axis of the saber saw or file 73, and of the shaper shaft 80, is radial of the axis of the turret plate, and as the turret plate is, in the preferred form, pivoted transversely of the plane of the turret plate, the line of work of the tools 73 and 83 is almost universal in angularity, with tremendous enhancement of the rigid guided work step accomplished by these tools.

In connection with the various tools of Figs. 10 to 19 inclusive, it will be seen that each provides a movable tool having a working axis and which is mounted on the turret plate with the working axis of the tool substantially radial of the axis of the turret plate. The tool itself has an end describing an arc about the turret axis, of which the table forms a chord, to form a segment of a circle above the table surface. With the selected tool coupled in driven relation to the motor, as has been described, the selected tool having the axis radial of the turret plate is power-driven in substantially all attitudes of the tool within the major part of the segment of the circle which it describes. As shown in full lines in Figs. 10 and 15, the selected tool may be disposed vertically so that, with reference to work on the table, the tool functioning is at 90° to the table surface in one plane. If it is desired to change the angle of working of the tool, the turret plate can be rotated to dispose the tool at the positions indicated in dotted lines in Figs. 10 and 15, at an illustrative angle of less than 90°. It will be seen that a large range of angular settings is thus attained, and, with the irreversible manual control of turret plate attitude, a rigid working unit is maintained. A further factor of importance in this phase of the invention is the added ability to tilt the turret plate in a plane normal to the plane of the segment of the arc described when the turret axis is parallel to the table. Thus, as shown in Fig. 12, the working tool axis can be adjusted relative to table 10 in two relatively normal planes, to effect substantially universal adjustments of the working axis of the tool, within the range of adjustments possible relative to the table surface.

One of the advantageous features of the invention as disclosed is the ability to change the mounting of a driven tool, from a position in which the axis of the tool is parallel to the table top and whereby a saw 53, for instance, mounted on the instant spindle is in a plane normal to the table top, to a position in which the axis of the tool is normal to the table top whereby the illustrative saw is positioned parallel to the table top.

A simple means for accomplishing this result is indicated in the fragmentary elevation of Fig. 3a. The modification consists in merely elongating the arcuate slot 85 in the guide bracket 86.

It will be evident that modification toward simplicity and enhanced safety may be made in the invention. One form, which accomplishes at least 90° cocking of the tool, is shown in Figs. 21 to 25.

Referring to Fig. 21, the work table 10 mounted on the legs 14 has a channel guide member 100 on each of the opposite sides, within which the parallel slidable rods 101 are mounted. The guide members 100 are disposed as clamps so that by tightening suitable screws or the like, 102, the slidable rods 101 can be rigidly anchored. The outer ends of the rods 101 are rigidly connected to a cross member 103. The slidable rods 101 can be telescoped into the guides under the edge of the table to juxtapose the end member 103 to the end of the table. On the other hand, on extension, the parallel rods 101 and the end member 103 form a rigid support for any desirable sort of removable table top, for an extension of the work space of the table or any other desired purposes. The end member 103 can be adjustably positioned to serve as a stationary guide for movable work. In extension the end member can be used for tool purposes, as by rotatably mounting a lathe spindle 104 in alignment with one of the vertically centered tool spindles on the turret plate, indicated at 105. With a piece of material, such as wood, engaged by the spindles, and with the spindle 105 power driven, the material can be rotated for work by a chisel or the like.

In furtherance of the wide angle of attitudes of a given tool, the organization shown in Figs. 21 to 25 inclusive is of importance. As shown in Fig. 23, the mounting plate 15 is formed as a channel member, which may be skeletonized as shown in Fig. 20 to avoid the formation of an arcuate slot 32, or it may be so slotted. In any case, it is so formed as to permit a full 120° of motion of the arm 33 and drive shaft 30.

The side plate members 15a are pivoted suitably to the horizontal table frame members 107, as at 108. This may be a simple pivot, or may be by gudgeons 89 sliding in arcuate guide members 99, as shown in connection with Fig. 27. On one side, this pivot 108 is a direct pivotal connection, and on the other the pivotal mounting is across the axis of a quadrant or sector gear 110 secured to the mounting plate 15, parallel to the longitudinal extent of the frame members 107, as shown in Fig. 23. The table, in the commercial forms, may be enclosed for appearance and safety, but the side closures are omitted herein for clarity. The turret plate 22a, in this illustrative form, is comprised of three parallel spaced plates 111, 112, and 113, held rigidly together by connecting pins and spacers 114, forming a rigid entity journalling the respective tool spindles and their clutch members.

These are similar to those already described. Preferably, however, the tool spindles 49' are three in number, with even angular spacing of 120° between them for reasons to be pointed out. A fixed side bracket 115 is mounted on a side frame member 107, as shown in Fig. 22, and in fragmentary form in Fig. 21. The bracket 115 suitably journals a worm gear 116 in permanent mesh with the teeth of the quadrant gear 110. A shaft 117 is rigid with the worm gear at one end and at its other end is journalled in a flange of the leg 14 aligned therewith. A crank 118 is provided on the end of the shaft 117, whereby from a point outside of the table in vertical projection the worm 116 can be rotated to positively move or hold the quadrant gear 110, and thus can swing the mounting plate 15 on its pivotal axis 108 through more than a full 90° and can hold it where set. This organization of quadrant gear 110, worm 116, shaft 117, and crank 118, is also used on the device of Fig. 27, to be described. The remainder of the apparatus in these figures is generally similar to that previously described. That is, the turret plate is controlled in its rotation by worm wheel 23 through worm 25 actuated by rod or shaft 24, the motor 17 is mounted on the platform bracket 8 and by its shaft 20 drives pulley 38, driving belt 37, which drives a pulley 36' mounted on driven shaft 30 journalled in the end of pivoted arm 33. Shaft 30 extends across or through plate 15 and mounts the male clutch member 31, carrying the antifriction ball 19, for bearing against the inner face of the inner plate 111 of the turret plate organization 22a. There is a difference between this form of the apparatus and that previously described, in that the upper pulley 36' is somewhat elongated and is spool-like, to permit the belt to work its way into alignment after the shaft 30 has been moved axially. There is preferably a further change. This lies in the clutch actuation. While, if desired, the same manual control knob 40 may be mounted on the drive shaft 30 for moving same axially, this requires reaching under the table for operation. It is preferred to have the clutch operative from outside of the vertical projection of the table of the apparatus. To this end, as an illustrative embodiment, the swinging arm 33 is mounted firmly on a stub shaft 120, journalled both for oscillation and for axial motion, on the mounting plate 15, and on a supplemental supporting bracket 121, in coaxial relation to the shaft 20 of the motor. A horizontal clutch rod 122 is journalled on and parallel to the mounting plate 15, and terminates outwardly in a handle 123, at the side of the table. The rod 122 rigidly mounts a clevis arm 125 straddling the shaft 120. A compression spring 124 surrounds the shaft 120 between the supporting bracket 121 and the lower end of the arm 33. Moving the rod 122 by its handle, through the clevis arm 125 moves the shaft 120 and the pivoted arm 33 and its entire upper assembly axially away from the mounting plate, and thus moves the drive shaft and male clutch end out of engagement with the female clutch member of the instantaneously aligned tool spindle, permitting the turret plate to be rotated by manual rotation of shaft 24, rotating the worm 25 in mesh with the turret-plate-coupled worm wheel 23. When turned out of alignment with the male clutch member the clutch rod can be released and the spring 124 forces the assembly of the pivoted arm 33 and drive shaft 30 toward the mounting plate 15, bringing the antifriction ball 19 against the inner face of plate 111, until with rotation of the latter the male clutch member again aligns with a female clutch member of a given tool spindle. At this point the spring, in further expansion, engages the clutch members and the drive from the motor is completed to the given tool spindle. It will be understood that the turret plate worm shaft and the clutch shaft both rotate arcuately with the turret plate with changes in angle of the latter. With an enclosure, such as side housing plates for the table, suitable arcuate slots will be provided for these rods.

It will be understood in connection with these figures that with four tools on the turret plate the range of swinging of the arm 33 is small if one tool is to be swung from a position just below the table, across the arc of movement above the table and down below the table on the other side without a second tool appearing above the table. When but three tools are provided as is presently preferred, a full arc of 120° can be attained and the tools can be provided with their rotative spindles closer to the surface of the table, with greater exposure of the working parts of the tools. In rotary saws, for instance, this permits the use of saws of greater diameter, which gives a greater radial extent of saw above the table for effective utilization. Thus, for instance, a thicker piece of wood can be efficiently sawed with three tools on the turret plate than when four are provided. This discussion is of importance because it will be recognized that in any event only one tool should be projected above the table top at the same time.

It being recognized that each of the preferred three tool spindles are freely rotatable when disconnected from the clutch, it will be seen that this arrangement conduces toward the easy, economical and efficient use of a band saw attachment, as shown in Fig. 26.

Referring to Fig. 26, a frame 130 is provided for anchoring to the table top beside the slot 13 therein. The actual table tops are horizontally slidable on the frame member to receive any desired slot widths. An idler pulley or roller 131 is journalled in the upper part of the frame 130. The turret plate 22a is rotated so that two of its three spindles 49' are in alignment horizontally below the table. A pulley or roller 132 is mounted on one spindle 49' of the two horizontally aligned spindles, of the turret plate. A pulley or roller 133 is mounted on the other horizontally aligned spindle 49'. The axes of rollers 132 and 133 are disposed at the ends of the 120° arc of movement of the swinging arm 33 and its mounted drive shaft 30. A band saw 134 is mounted on the three rollers. If desired, this may pass between a pair of auxiliary guide rollers 135—135 mounted on the frame 130. The clutch from the motor drive is coupled to one of the lower rollers 132 or 133 at one end or the other of the arcuate movement of drive shaft 30 to drive the band saw, while the other of said lower rollers acts as an idler roller. The cheapness and effectiveness of this rig for the purpose will be obvious, as will the fact that it requires mutual cooperation of two of the tool spindles in simultaneously securing a unified single tool actuation result.

Novel and important as is the apparatus disclosed in the earlier figures, it is susceptible to further appreciable reductions in costs, with enhanced scope of action and with the attainment of certain safety features which are highly important, while providing the very desirable additional attribute of facile change of speed ratios.

Referring to Figs. 27, 28, and 29, a desirable form of the invention is shown, in which a swinging but otherwise non-rotatable mounting or bracket plate 15' is provided, suitably supported for swinging through at least 90° relative to the table top 10, on the frame members organized as shown in Fig. 21, as by gudgeons or trunnions 89 of adequate length slidably guided in arcuate slots in lateral guide members 99. Bracket plate 15' is either cut away as in Fig. 20 to form a skeleton support, or, if relatively solid, has an arcuate slot 32' of at least 120° of angular extent, about an axis to be described. Concentric with the arcuate slot is the preferably hollow tubular shaft 21' in fixed normal relation to the support plate 15'. A skeletonized turret plate 22' preferably comprising a casting with studs for journalling spindles is journalled for rotation on the hollow shaft 21', and the latter mounts in its respective studs preferably three spindles 49a, spaced, as noted, at 120° about the turret plate.

The spindle organizations and female clutch units are the same as have been previously described, and the face of the turret plate is planar and smooth between the three female cone clutch members on the side toward the relatively stationary bracket plate 15'. A worm wheel 23 is mounted on the turret plate concentric with shaft 21', and in constant mesh with the worm gear 25 on worm shaft 24, suitably journalled on the mounting plate 15', with a control wheel (not shown in these figures) mounted laterally of the apparatus, for controlling the setting of the turret plate 22'.

A unique drive unit is provided, which, as will be seen, obviates the platform-mounting of the motor of the earlier figures, and the variations in belt tensioning, alignment and wear associated with the organizations previously described, with additional advantages as will be pointed out. The drive unit is comprised of a gravitationally biased unit urged toward centering the power output shaft 30' at the apex of the arc of movement of a tool moving above the table top. In this organization, the usually tubular shaft 21', which is only tubular in case control rods or the like are to be disposed and moved therein, comprises a central axis normal to the mounting plate 15' and to the turret plate 22', in all of the dispositions of the mounting plate. Pivotally mounted on the tubular shaft 21', and axially slidable thereon, in response to actuation to be described, is the asymmetrical bracket 200, of modified figure 8 profile. The bracket 200 comprises a unit having a large annular motor-supporting member 203, and an integral small annular boss 204 for a change speed control threaded shaft, to be described, and a perpendicularly extending tubular bracket portion 201, slidable and oscillatable on the shaft 21'. The bracket 200 comprises an open ring-like lower portion 203 upon and usually within which the motor 17 is rigidly mounted, with the axis of its shaft 20 normal to the plane of bracket 200.

Detachably mounted on the shaft portion 201 of the bracket 200 is the shaft spindle bracket 206, which is rigidly connected thereto so as in effect to form part of bracket 200, although axially offset from the latter. The spindle bracket has a hub portion 219 rotatable and slidable on the shaft 21' with shaft portion 201 to which it is secured, and has two parallel journals 207 and 208, of the ball or roller bearing thrust type, in radial alignment, preferably, with tubular shaft 21'. In the lower or radially inward bearing 207, a shaft 210 is journalled, mounting a fixed pulley 211 and a pulley 209 in axially spaced relation. Pulley 209 may be a fixed pulley, or may comprise a split pulley of which one-half is fixed to shaft 210, and the complemental other half 222 is an axially movable portion adjusted in setting by the threaded shaft 205 mounting the manually rotatable knurled knob 215 and threaded through a suitable aperture in the upper end 204 of the bracket 200. At the inner end, the threaded shaft 205, by an anti-friction ball or the like 220 bears against a hollow shaft 221 integral with the complemental pulley half 222, juxtaposed to and keyed for rotation with the fixed pulley portion or half, and susceptible to slight axial motions relative thereto.

The motor shaft 20 mounts a pulley 38' which may be a fixed pulley, but in the change speed ratio device disclosed comprises a fixed pulley half 224 adjacent to the motor 17, and the axially adjustable pulley half 225 keyed to the motor shaft and urged toward the fixed half 224 by the compression spring 226. The median diametrical axes of the lower pulley 38' and pulley 209 are always in alignment and the belt 227 mounted on the respective pulleys is always in alignment with the diametrical plane common to motor shaft 20 and journalled shaft 210, although the speed ratio of transmission varies as the belt rises or fails relatively on the respective pulleys under the control of the threaded shaft 205 modifying the opening of the pulley 209.

The outer bearing or journal 208 of the bracket 206 journals the driving member comprised of shaft 30' mounting the male cone clutch element 31', and the turret plate riding anti-friction ball or like member 19' at one end, and a driven pulley 212 at the opposite free end, in parallelism and radial alignment with the pulley 211 on the shaft 210. This alignment is constant and the pulleys mount the drive belt 213.

It will be observed that the center of gravity of the last described compound rigid bracket organization, comprised of bracket 200, shaft or hub 201, and bracket 206, is substantially centered in the motor 17, at least it is below the axis of tubular shaft 21'. When free to adjust itself, the compound bracket is gravitationally biased toward and assumes a vertical position. This places the spindle drive shaft 30' at the upper center of the stationary bracket or plate 15' at its closest relation to table 10. This normally requires therefore that any given tool disposed on the turret plate to be engaged by the clutch and started in rotation, as, for instance, the saw 53 disclosed, must be swung with the turret plate 22' from whatever position it had below the table, upwardly through the slot 13 therein and relative to the instant work, if any, on the table, and to reach a substantially mid-position before having its female clutch member aligned with the gravity biased male clutch member, preparatory to engagement and the powered rotation of the tool. This insures that if the slidable table top or of work thereon is over or intersects the translational path of a given tool, such for instance as the saw 53, this cannot cause an accident, as the tool must reach its proper maximum cutting depth position before clutching engagement with the motor. Of course, as in using the device of Fig. 27, or for any other purpose, any desired means can be provided for swinging the bracket assembly against its bias to either end of its free oscillation, for engaging a desired tool spindle, or it may be manually, directly, so swung. It will be seen, however, that after once being clutched and in driven relation to the motor, subsequent oscillations of the turret plate 22' through the range of at least 120° can dispose the tool spindle below the table on one side, can move through its maximum arc, to a position below the table top on the other side, as in the earlier described forms of the invention, but, of course, with a longer arcuate path, as described.

An operator-controlled oscillatable clutch shaft 230, mounting an operating crank 250, is suitably journalled on the bracket plate 15', as by a mounting bracket 251, and in axial spacing the shaft 230 mounts a pair of fixed radially extending arms 231, 231, each having an inturned free end, including a roller 252, disposed in a peripheral groove 232 in the end of the hub of bracket 206. The two arms 231, 231 provide a clevis for axially shifting the brackets 206 and 200 as a unit, upon rocking shaft 230 upon its axis. As the unit moves axially of tubular shaft 21' the drive shaft 30' is retracted or extended axially relative to bracket plate 15' for respectively uncoupling or coupling the clutch. It is contemplated that the clevis 231 will have positive motions between locked positions by suitable toggle mechanisms, or the like, so that the clutch can be moved in and held or moved out and held, when desired, by controlled oscillations of shaft 230. If desired, however, the clutch may be manually actuated in one direction, say, for declutching, while the movable power unit bracket assembly will be moved in the other direction by suitable springs, such as by a spring 124', surrounding the outer end of the tubular shaft 21' and engaging a terminal flange thereon at one end, and the motor mounting bracket unit in the other.

It will be noted that the drive unit is movable as a unit between clutching and declutching, by sliding on tubular shaft 21', and that in all positions the alignment of the pulleys and drive belts is maintained so that wear and variations in tensions on the belts is eliminated. The advantages of this form of the invention will be apparent.

Having thus described my invention, I claim:

1. A tool apparatus comprising a table, a support below the table, a turret plate mounted for rotation on said support below said table, a rotatable tool mounted on the turret plate having a working portion movable above the level of said table with rotations of said plate, said rotatable tool incorporating driven means for actuating same when energized, power means mounted on the support, an axially movable driving member in driven relation to said power means and movable in translation in an arc substantially tangent to said table, means on said driving member operative while the working portion of the tool is substantially above the level of said table for engaging and disengaging the driven means of the tool with axial movement of the driving member, and means for rotating said turret plate to present said tool with a working portion above the level of said table for engagement of its driven means with the engaging and disengaging means on said driving member, said turret plate and driving member having limited conjoint arcuate movements as the tool moves bodily in translation relative to said table.

2. A tool apparatus comprising a support, a table, a turret plate, means mounting the turret plate for rotation relative to the support below said table, an arm, means pivotally mounting the arm for oscillation on a pivot substantially coaxial with the rotative axis of said turret plate below said table, a driving shaft journalled in the arm spaced from the pivot thereof extending transversely of the support toward the turret plate, a rotatably driven tool on the turret plate having a driving axis parallel to the axis of the turret plate and having a working portion movable relative to and upwardly beyond said table with rotation of said turret plate, complemental clutch means on the tool and said driving shaft which when aligned and engaged establishes driving relation between the drive shaft and said tool and when predeterminedly disengaged permits rotation of the turret plate to move the tool out of alignment with said drive shaft.

3. A tool apparatus comprising a support, a table having a tool clearance edge, and connected to the support, a turret plate, means mounting the turret plate for movement relative to the support, a drive shaft, means mounting the drive shaft to extend transversely of the support substantially normal to said turret plate, means on said mounting means permitting limited motion of the drive shaft in the same direction as the movement of said turret plate, a tool mounted on the turret plate, means for moving the turret plate to align or misalign the tool and said drive shaft, complemental clutch means on the drive shaft and said tool for engaging the shaft and tool when in alignment, said means for moving the turret plate effective to move the tool and the engaged drive shaft transversely of said edge in a limited movement, power means actuating said drive shaft, and means for moving said drive shaft between engagement and disengagement of the complemental clutch means, said means for moving the turret plate operative during disengagement of said complemental clutch members for moving the turret plate and said tool into misalignment with said drive shaft, and during engagement of the complemental clutch members for moving the turret plate and drive shaft arcuately while moving the engaged tool transversely of the table in parallelism with said edge.

4. A tool apparatus comprising a table having a tool-working edge, a support connected to the table, a turret plate, means mounting the turret plate for rotation on and relative to said support, a tool on said turret plate comprising spindle means journalled in the turret plate and a clutch member recessed in one face of the turret plate in driving relation to said spindle, means for rotating said turret plate so that said tool starting below the table moves in an arc across the table adjacent to said edge to a position below said table, an arm pivotally mounted on said support coaxial with the turret plate, a drive shaft journalled in said arm, means biasing the drive shaft toward the turret plate, a complemental clutch member on the end of the drive shaft disposed to couple the drive shaft and tool spindle in driving relation when said tool spindle is substantially aligned with said drive shaft as a result of either the rotation of the turret plate relative to the drive shaft, or the oscillation of said arm and drive shaft relative to said turret plate, means for axially shifting said drive shaft against the bias to permit relative arcuate movement of either the turret plate and tool or the drift shaft and arm, and power means for driving said drive shaft.

5. A tool apparatus comprising a work table, a rotary tool, rotatable means mounting said tool, means for holding said rotatable means against rotation or for rotating said rotatable means for moving the tool transversely of the table in translation in an arc when the means for holding or rotating is actuated so that the periphery of the tool describes a second arc subtended by the table as a chord, whereby that portion of work disposed on said table in intersected relation to said subtended second arc may be operated upon by said rotary tool as the latter moves bodily into translation transversely of the table, said means for holding or rotating holding said tool against bodily translation at any selected disposition of its periphery on said second arc whereby work moving relatively to the table and to said tool may be operated upon to the depth determined by the spacing of said periphery from said table on its second arc, power means selectively coupled to said tool, and means supporting said power means for movement on a limited arc about an axis in alinement with the axis of said rotatable means for rotating said tool at any disposition on and during the movement of its periphery on said second arc.

6. A tool apparatus comprising a primary support including a table, rotatable tool-mounting means, means mounting the tool-mounting means for rotation on a first axis on said support, a tool including a rotatable shaft having a second axis, means mounting the tool on the mounting means with said second axis substantially parallel to and spaced radially of said first axis whereby rotation of said tool-mounting means moves said second axis in an arc about said first axis, secondary support means, means pivotally mounting said secondary support means for oscillation on said primary support on an axis substantially coincident with said first axis in a path of oscillation in general parallelism with said tool-mounting means, driving means journalled on said secondary support means on an axis substantially parallel to and spaced from said first axis substantially the same distance as that between said first and second axes so that the axis of said driving means substantially intersects said arc and in movement with said secondary support means on its path on its pivotal axis describes a partial arc substantially coincident with a portion of said arc, complemental disconnectible coupling means on said driving means on said shaft of said tool, and power means for actuating said driving means in all positions of said secondary support means on its said path.

7. A tool apparatus as recited in claim 6, in which said tool has a working portion spaced radially of the first axis beyond the said second axis and movable with the tool-mounting means in an arc about said first axis, and in which said table forms a chord subtending said last mentioned arc.

8. Tool apparatus as recited in claim 6, in which said tool has a working portion spaced radially of the first axis beyond the second axis and movable with the tool-mounting means in an arc about said first axis, in which said table forms a chord subtending said last mentioned arc, and in which the tool-working portion is actuated by the driving means when coupled to the shaft of said tool at any point thereof in the major portion of the arc subtended by said chord by reason of the axial alignment of the driving means with the shaft of said tool attainable by adjustments of said secondary support on its said axis.

9. Tool apparatus as recited in claim 6, in which said tool has a working portion spaced radially of the first axis beyond the second axis and movable with the tool mounting means in an arc about said first axis, in which the table forms a chord subtending said last mentioned arc, said driving means when coupled to the shaft of said tool movable with the secondary support on its pivotal axis with that arcuate movement of said tool-mounting means moving said tool-working portion through a major portion of the arc subtended by said chord, and manually movable means for rotating said tool-mounting means operable during said coupled relation of the driving means and the shaft of said tool, said manually movable means when stationary being irreversible from torque from said tool-mounting means.

10. Tool apparatus as reicted in claim 6, in which means are provided for limiting the oscillations of said secondary support on its said pivotal axis.

11. A tool apparatus as recited in claim 6, in which the tool-mounting means and its axis of rotation are below said table, in which the tool has a working portion with a working axis generally radial of the first axis with an end projecting beyond the tool-mounting means and with said tool movable in translation transversely of the table with rotation of the tool-mounting means, whereby said end describes an arc about said first axis subtended by the table as a chord, said driving means disposed for coupled driving engagement with the shaft of said tool in any location of the end of said tool along the major portion of the segment of the arc subtended by said chord to actuate said tool with its working axis in a predetermined angular relation to the table in the plane of the chord-subtended arc of the tool-end movement.

12. A tool apparatus as recited in claim 6, in which the tool-mounting means and its axis of rotation are below said table, in which the tool has a working portion with a working axis generally radial of the first axis with an end projecting beyond the tool-mounting means and with said tool movable in translation transversely of the table with rotation of the tool-mounting means, whereby said end describes an arc in a plane about said first axis subtended by the table as a chord, said driving means disposed for coupled driving engagement with the shaft of said tool in any location of the end of said tool along the major portion of the segment of the arc subtended by said chord to actuate said tool with its working axis in a predetermined angular relation to the table in the plane of the chord-subtended arc of the tool-end movement, said table being fixed against tilting so as to furnish a stable support for work at all times, and means for angularly varying the plane of the chord subtended arc to establish a variable angular relation of the working axis of said tool in the other of two relatively normal planes of which one is the said plane about said first axis.

13. Tool apparatus as recited in claim 6, in which the driving means comprises a rotatable shaft axially slidable in said secondary support, said power means comprises a motor, transmission means between the motor and said driving means rotatable shaft to drive the latter in all positions of said secondary support, said disconnectible means comprises complemental clutch members, and means for moving said driving means rotatable shaft axially relative to said secondary support and to said mounting means in one direction to disconnect said complemental clutch members to permit rotation of the mounting means relative to said driving means and in the other direction to connect the complemental clutch members when they are in substantial axial alignment.

14. A tool apparatus as recited in claim 13 in which said means for moving comprises spring means biasing said driving means rotatable shaft axially toward connection of said complemental clutch members, and anti-friction means on said driving means rotatable shaft for bearing against said tool mounting means when said complemental clutch members are out of alignment.

15. A tool apparatus comprising table means effecting a generally horizontal work surface having an edge, a support, a turret plate mounted on a turret axis for rotation below and relative to said work surface, a rotatable tool spindle mounted on the turret plate on a spindle axis parallel to and spaced radially from said turret axis for mounting a rotatable tool, the periphery of which is extensible across said edge with rotations of said turret plate, a power unit comprising power means and a driving member in driven engagement with said power means, means for engaging and disengaging said driving member relative to said spindle, means for rotating said turret plate to position said spindle and thus such rotatable tool, means establishing limited conjoint arcuate movements of said turret plate and said driving member during the engagement thereof with said spindle with rotation of said turret plate, whereby the spindle is variably positioned in driven relation on the range of conjoint arcuate movements of the turret plate and said driving member with relation to said edge of said work surface.

16. A tool apparatus as recited in claim 15, and means for swinging said support relative to said table means in a vertical plane passing through the turret axis.

17. A tool apparatus comprising table means effecting a work surface, a support below said work surface, a turret plate mounted for rotation on said support below said work surface, a rotatable tool spindle mounted on the turret plate to move bodily in an arc with rotations of the turret plate, said spindle incorporating driven means for actuating same when energized, power means, a driving member in driven relation to said power means, means operatively associated with said driving member for engaging and disengaging same with the driven means of said tool spindle, means for rotating said turret plate to position said spindle on its arc of movement, and means establishing limited conjoint arcuate movements of said turret plate and said driving member.

18. A tool apparatus as recited in claim 17, in which said conjoint arcuate movement is through substantially 120°.

19. A tool apparatus as recited in claim 17, and means for swinging the support and thus the turret plate relative to the table means through substantially 90°.

20. A tool apparatus as recited in claim 17, and a second tool spindle rotatably mounted on said turret plate in angular spacing from said rotatable tool spindle, roller means mounted on said respective spindles, a frame mounted on said table means, roller means journalled on said frame, a band saw encircling the respective roller means whereby when one of said tool spindles is in driven relation to said power means the band saw is driven and uses the roller means on the other of said spindles and the roller means on said frame as idlers.

21. A tool apparatus as recited in claim 17, and manual means for effecting the said engagement or disengagement.

22. A tool apparatus as recited in claim 17, in which said means operatively associated comprises a clutch member on said driving member, and in which said driving member is susceptible to axial movements, and manual means for effecting axial movements of said driving member in at least one direction.

23. A tool apparatus as recited in claim 17, and said driving member being normally biased toward the substantial center of its limited conjoint arcuate movement path.

24. A tool apparatus as recited in claim 17, and bracket means mounted on said support and oscillatable about an axis, said power means mounted on said bracket means generally below said axis, said driving member journalled on said bracket means generally above said axis and forming an assembly having a center of gravity below said axis to gravitationally urge said bracket means to assume a position on its said axis at which said driving means is at its uppermost position.

25. A tool apparatus as recited in claim 17, and bracket means mounted on said support and oscillatable about an axis, said power means mounted on said bracket means generally below said axis, said driving member journalled on said bracket means generally above said axis and forming an assembly having a center of gravity below said axis to gravitationally urge said bracket means to assume a position on its said axis at which said driving means is at its uppermost position, and manual means for axially shifting said bracket means for establishing the engagement and disengagement of said driving member.

26. A tool apparatus as recited in claim 17, and bracket means mounted on said support and oscillatable about an axis, said power means mounted on said bracket means generally below said axis, said driving member journalled on said bracket means generally above said axis and forming an assembly having a center of gravity below said axis to gravitationally urge said bracket means to assume a position on its said axis at which said driving means is at its uppermost position, manual means for axially shifting said bracket means for establishing the engagement and disengagement of said driving member, said manual means comprising an oscillatable rod transverse of said axis, and clevis means on said rod operative substantially axially against said bracket means.

27. A tool apparatus as recited in claim 17, said turret plate mounting comprising an axis of rotation generally normal of said support, said spindle having an axis parallel to the axis of rotation of said turret plate, said spindle arranged to mount a rotatable tool having a general plane of rotation generally parallel to said support, and means for swinging said support relative to said table means between positions in which the axis of said spindle is parallel to said table means and that in which it is substantially normal thereto whereby in such latter position such rotatable tool is generally parallel to and above said work surface.

28. A tool apparatus as recited in claim 17, said turret plate mounting comprising an axis of rotation, a shaft on said support coaxial with said axis of rotation, bracket means journalled on said shaft for oscillation and for axial movement thereon, said power means having an output shaft and mounted on said bracket means with said output shaft effectively parallel to said coaxial shaft, said bracket means journalling said driving member against relative axial motion and with its axis parallel to the axis of said output shaft of said power means, transmission means between the output shaft of said power means and said driving member, and means for axially shifting the bracket means to establish said engaging and disengaging.

29. A tool apparatus as recited in claim 17, said turret plate mounting comprising an axis of rotation, a shaft on said support coaxial with said axis of rotation, bracket means journalled on said shaft for oscillation and for axial movement thereon, said power means having an output shaft and mounted on said bracket means with said output shaft effectively paralllel to said coaxial shaft, said bracket means journalling said driving member against relative axial motion and with its axis parallel to the axis of said output shaft of said power means, transmission means between the output shaft of said power means and said driving member, and means for axially shifting the bracket means to establish said engaging and disengaging, the assembly of elements on said bracket means establishing a center of gravity thereof below said shaft whereby the said driving member is biased toward a generally central position on its arc of movement on said shaft.

30. A tool apparatus as recited in claim 17, said turret plate mounting comprising means providing an axis of rotation, a shaft on said support coaxial with said axis of rotation, bracket means journalled on said shaft for oscillation and for axial movement thereon, said power means having an output shaft and mounted on said bracket means with said output shaft effectively parallel to said coaxial shaft, said bracket means journalling said driving member against relative axial motion and with its axis parallel to the axis of said output shaft of said power means, transmission means between the output shaft of said power means and said driving member, means for axially shifting the bracket means to establish said engaging and disengaging, said transmission means comprising a jack shaft on said bracket means, adjustable pulley means on said jack shaft, transmission means between said jack shaft and said driving member, adjustable pulley means on the output shaft of said power means, a belt extending about and between the respective adjustable pulleys, and means for effecting change of speed ratios between said respective pulley means.

31. A tool apparatus as recited in claim 17, and guide means on opposite sides of said table means, a pair of rods mounted in said guide means, an end connection joining the outer free ends of said rods whereby the effective work surface can be extended by telescopic action of said rods relative to said table means.

32. A tool apparatus as recited in claim 17, and guide means on opposite sides of said table means, a pair of rods mounted in said guide means, an end connection joining the outer free ends of said rods whereby the effective work surface can be extended by telescopic action of said rods relative to said table means, and means for locking the rods in an adjusted position relative to said table means.

33. A tool apparatus comprising a work table, a rotary tool, rotatable means mounting said tool, means for holding said rotatable means against rotation or for rotating said rotatable means for moving the tool transversely of the table in translation in an arc when the means for holding or rotating is actuated so that the periphery of the tool describes a second arc subtended by the table as a chord, whereby that portion of work disposed on said table in intersected relation to said subtended second arc may be operated upon by said rotary tool as the latter moves bodily in translation transversely of the table, said means for holding or rotating holding said tool against bodily translation at any selected disposition of its periphery on said second arc whereby work moving relatively to the table and to said tool may be operated upon to the depth determined by the spacing of said periphery from said table on its second arc, power means selectively coupled to said tool, and means supporting said power means for movement on a limited arc about an axis in alinement with the axis of said rotatable means for rotating said tool at any disposition on and during the movement of its periphery on said second arc.

34. A tool apparatus comprising a table fixed against tilting having a generally horizontal work surface furnishing a continuously stable support for work, tool-spindle-mounting means journalled on the table and having an axis of rotation, means for moving said mounting means on its said axis, additional means for moving said mounting means between a position at which said axis is substantially parallel to and below said work surface and a position at which said axis is substantially normal to said work surface, a rotatable tool spindle journalled on the mounting means in parallelism with and in radial spacing from said axis so that when the mounting means is moved on its said axis a given point on said spindle traverses an arcuate path in a plane determined in its relation to the work surface by the instantaneous positioning of the axis of the mounting means, powered driving means for driving relation to said spindle, and means supporting said driving means for limited conjoint arcuate movement with said tool spindle in any position of said axis.

References Cited in the file of this patent

UNITED STATES PATENTS

| 139,644 | Young | June 3, 1873 |
| 198,426 | Stafford | Dec. 18, 1877 |
| 1,113,201 | Cummins | Oct. 13, 1914 |
| 1,331,949 | Baldwin | Feb. 24, 1920 |
| 1,449,361 | Wink | Mar. 20, 1923 |
| 1,733,208 | Schimmel | Oct. 29, 1929 |
| 1,769,656 | Sullenberger | July 1, 1930 |
| 1,852,324 | Long | Apr. 5, 1932 |
| 1,867,269 | Kimble | July 12, 1932 |
| 2,058,680 | Gorsline | Oct. 27, 1936 |
| 2,168,282 | Tautz | Aug. 1, 1939 |
| 2,347,918 | Lethenstrom | May 2, 1944 |

FOREIGN PATENTS

| 140,063 | Australia | Jan. 25, 1951 |